(12) United States Patent
Galway et al.

(10) Patent No.: US 10,259,539 B1
(45) Date of Patent: Apr. 16, 2019

(54) PORTABLE LIGHTWEIGHT APPARATUS FOR TRANSFERRING HEAVY LOADS

(71) Applicants: Robert J. Galway, Virginia Beach, VA (US); Daniel J. Galway, Virginia Beach, VA (US)

(72) Inventors: Robert J. Galway, Virginia Beach, VA (US); Daniel J. Galway, Virginia Beach, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 361 days.

(21) Appl. No.: 15/153,023

(22) Filed: May 12, 2016

Related U.S. Application Data

(62) Division of application No. 13/776,861, filed on Feb. 26, 2013, now Pat. No. 9,381,979.

(51) Int. Cl.
| | | |
|---|---|---|
| *B63B 27/30* | (2006.01) | |
| *B66C 23/52* | (2006.01) | |
| *B65G 67/62* | (2006.01) | |
| *B66C 23/36* | (2006.01) | |
| *B63B 7/00* | (2006.01) | |

(52) U.S. Cl.
CPC ............... *B63B 27/30* (2013.01); *B63B 7/00* (2013.01); *B65G 67/62* (2013.01); *B66C 23/36* (2013.01); *B66C 23/52* (2013.01); *B65G 2814/0397* (2013.01)

(58) Field of Classification Search
CPC ........... B63C 7/02; B66C 23/52; B63B 27/12; B63B 27/30; B63B 7/00

USPC .......... 114/44, 51, 26, 61.22; 212/307, 324; 414/140.3, 141.3, 142.6, 142.7, 803
See application file for complete search history.

(56) References Cited

U.S. PATENT DOCUMENTS

| | | | | |
|---|---|---|---|---|
| 2,378 | A * | 12/1841 | Custis | B63C 7/04 114/51 |
| 304,040 | A | 8/1884 | Snee | |
| 541,794 | A * | 6/1895 | Schon | B63C 7/04 114/51 |
| 798,973 | A * | 9/1905 | Pett | B63B 23/18 114/374 |
| 1,659,647 | A * | 2/1928 | Althouse | B63C 7/04 114/51 |
| 1,952,238 | A * | 3/1934 | Dice | B60S 11/00 212/180 |
| 4,075,860 | A | 2/1978 | Hansen | |
| 4,106,641 | A | 8/1978 | Campbell et al. | |

(Continued)

FOREIGN PATENT DOCUMENTS

| | | |
|---|---|---|
| EP | 1350716 | 10/2003 |
| EP | 1927569 | 6/2008 |

*Primary Examiner* — Michael R Mansen
*Assistant Examiner* — Juan J Campos, Jr.
(74) *Attorney, Agent, or Firm* — Dave A. Ghatt

(57) ABSTRACT

A method and apparatus for the water-based transfer of heavy loads. The invention is a lightweight apparatus is reconfigurable, and it includes a gantry arrangement mounted on beams or a platform and the apparatus is used to transfer heavy load items. The apparatus reconfigurable and may be used in a water-based loading environments in performing a variety of loading functions in situations involving one or more watercrafts and/or a pier or the like.

6 Claims, 11 Drawing Sheets

(56) References Cited

U.S. PATENT DOCUMENTS

| | | | | |
|---|---|---|---|---|
| 4,190,013 A * | 2/1980 | Otis | ................. | B63C 1/02 114/263 |
| 4,227,846 A | 10/1980 | Koskivirta | | |
| 4,480,757 A * | 11/1984 | Oustad | ................. | B66C 23/52 212/198 |
| 4,568,232 A | 2/1986 | Ray et al. | | |
| 4,569,453 A * | 2/1986 | Oustad | ................. | B66C 23/52 212/299 |
| 5,131,784 A * | 7/1992 | Maasen | ................. | B63B 35/40 114/44 |
| 5,154,561 A | 10/1992 | Lee | | |
| 5,520,135 A | 5/1996 | Rolland et al. | | |
| 5,868,091 A * | 2/1999 | Gross | ................. | B63B 1/121 114/61.1 |
| 6,010,295 A | 1/2000 | Sridhar | | |
| 6,152,065 A * | 11/2000 | Gronstrand | ............. | B63B 23/30 114/365 |
| 6,260,502 B1 | 7/2001 | Kratz et al. | | |
| 7,073,673 B2 | 7/2006 | Takehara et al. | | |
| 7,296,528 B1 | 11/2007 | Doyle et al. | | |
| 7,618,223 B1 * | 11/2009 | Begley | ................. | A61G 3/063 114/362 |
| 7,845,296 B1 | 12/2010 | Khachaturian | | |
| 7,908,988 B1 * | 3/2011 | Khachaturian | ........ | B63B 27/16 114/51 |
| 8,777,513 B2 * | 7/2014 | Devitt | ................. | B63C 3/06 114/44 |
| 8,869,726 B2 | 10/2014 | Skiadas | | |
| 8,960,114 B2 * | 2/2015 | Khachaturian | ........ | B63B 27/36 114/51 |
| 9,003,988 B2 * | 4/2015 | Khachaturian | ........ | B63C 7/04 114/51 |
| 9,381,979 B1 * | 7/2016 | Galway | ................. | B63B 27/30 |
| 2001/0006590 A1 * | 7/2001 | Bishop | ................. | B63C 3/06 405/3 |
| 2009/0078189 A1 * | 3/2009 | Kazmierowicz | ........ | B63B 3/08 114/77 R |
| 2009/0084303 A1 * | 4/2009 | Kazmierowicz | ........ | B63B 3/08 114/344 |
| 2010/0263581 A1 * | 10/2010 | Khachaturian | ........ | B63B 1/121 114/61.16 |
| 2011/0150623 A1 | 6/2011 | Thomas et al. | | |
| 2011/0236174 A1 | 9/2011 | Escher | | |
| 2013/0139743 A1 | 6/2013 | Khachaturian | | |
| 2013/0160692 A1 | 6/2013 | Skiadas | | |
| 2013/0180444 A1 | 7/2013 | Harris et al. | | |
| 2015/0013584 A1 * | 1/2015 | Escher | ................. | B63B 1/121 114/26 |
| 2015/0259053 A1 * | 9/2015 | Khachaturian | ........ | B63C 3/06 414/803 |

\* cited by examiner

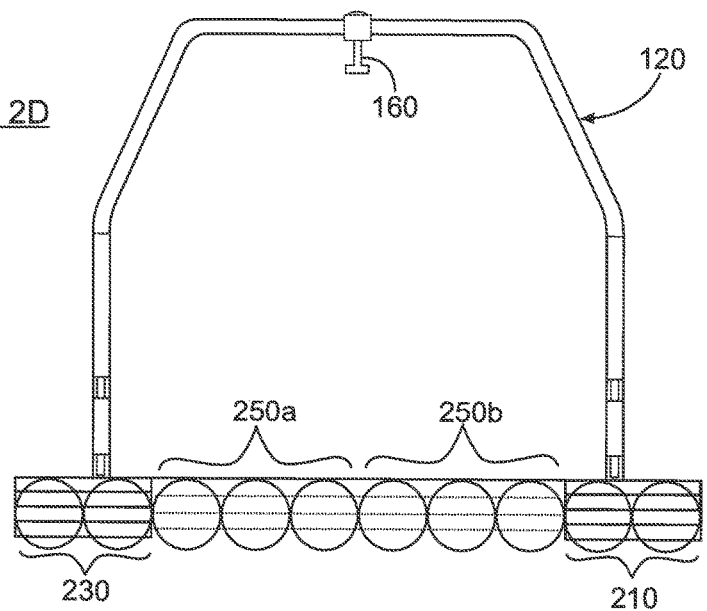
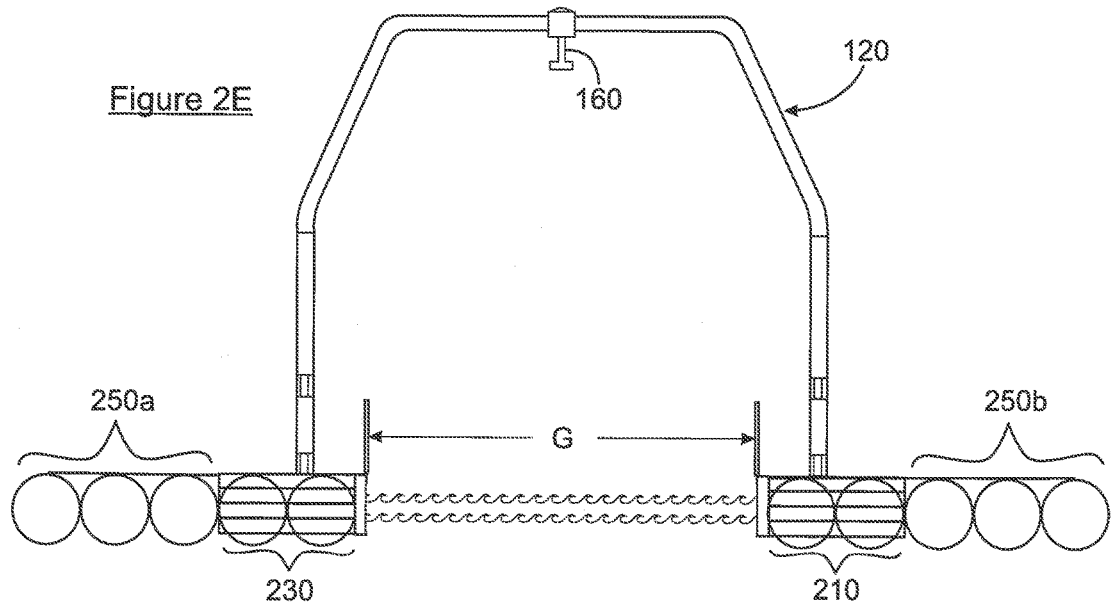

PORTABLE LIGHTWEIGHT APPARATUS FOR TRANSFERRING HEAVY LOADS

CROSS REFERENCE TO RELATED APPLICATIONS

This is a division of U.S. patent application Ser. No. 13/776,861, filed Feb. 26, 2013, now pending, which is herein incorporated by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a method and apparatus for the water-based transfer of heavy loads, and in particular, a lightweight apparatus including a gantry arrangement that may be assembled and used to transfer heavy load items. The apparatus may be used in water-based loading environments, in situations involving one or more watercrafts and/or a pier or the like.

BACKGROUND

The transfer of heavy loads from one vehicle to another is sometimes difficult to execute in remote land-based or water-based environments. In water-based environments, the transfer of heavy loads from one watercraft to another is desired because such a transfer negates the requirement for a shore-based transfer. If the heavy load is some type of cargo or unmanned marine vehicle, and is to be transferred to another water craft, it would be efficient to transfer the cargo load in the water, as opposed to bringing the water crafts to shore to perform the cargo transfer. Also there are scenarios in shallow water or riverine environments where on-site repair of an engine or transmission, for example, may be necessary. An engine may weigh about 1,000-2,000 lbs. and would require some type of specialized lifting equipment. Typically, this would require the craft to be brought to shore and the loading or off-loading may be performed by a crane. In the case of engine failure, it may not be possible to bring the craft to shore if the craft is dependent on the damaged engine for propulsion. Thus, it is desired to have an apparatus that provides the capability of repair or maintenance or the like in shallow water environments.

In land-based environments, load transfers may be difficult because of the remoteness and the topography of the surface involved. Typically, the transfer of cargo from one vehicle to another would require a tremendous amount of man-power. A flexible apparatus for providing this service is desired. Regardless of the environment, it is also desired that the apparatus is lightweight and field erectable.

SUMMARY

In one aspect, the invention is a lightweight buoyant apparatus for transferring heavy loads. The lightweight buoyant apparatus includes a floating platform arrangement having a first end portion, a second end portion, and a removable middle portion between the first end portion and the second end portion. In this aspect, each of the first end portion, the second end portion, and the middle portion comprise a plurality of inflated tubes. The lightweight buoyant apparatus also includes a gantry having a plurality of substantially U-shaped load transferring frames. Each of the substantially U-shaped load transferring frames includes a first vertical strut on the first end portion, a second vertical strut supported on the second end portion, and a substantially U-shaped crossbeam extending from the first vertical strut to the second vertical strut. The substantially U-shaped crossbeam has a horizontal rail support section extending in an X-direction over the removable middle portion of the floating platform arrangement. The gantry also includes a rail for slidingly supporting a load, the rail extending in a Y-direction, perpendicular to said X-direction. In this aspect, the rail is supported at a midpoint of each of the plurality of horizontal rail support sections.

In another aspect, the invention is a lightweight buoyant apparatus for transferring heavy loads. The lightweight buoyant apparatus includes a reconfigurable floating platform arrangement having a first end portion having an outer edge and an inner edge, a second end portion having an outer edge and an inner edge, and a third portion reconfigurable into several different arrangements. In this aspect the third portion is reconfigurable into a first arrangement in which the third portion is positioned between inner edges of the first end portion and the second end portion, or a second arrangement in which the third portion is divided into two separate equal raft sections, wherein one of the two raft sections is optionally attached to an outer edge of the first end portion and the other of the two raft sections is optionally attached to an outer edge of the second end portion leaving a wholly open section between the first end portion and the second end portion. According to the invention the third portion is reconfigurable into a third arrangement in which the third portion is divided into two separate equal raft sections, wherein one of the two raft sections is optionally attached to an outer edge of one of the first end portion and the second end portion, and the other of the two raft sections is positioned between the first end portion and the second end portion leaving a half-cut-out section between the first end portion and the second end portion. In this aspect, the lightweight buoyant apparatus includes a plurality of substantially U-shaped load transferring frames, each of the substantially U-shaped load transferring frames having a first vertical section supported on the first end portion, a second vertical section supported on the second end portion, and a substantially U-shaped crossbeam extending from the first vertical section to the second vertical section, the substantially U-shaped crossbeam having a horizontal rail section extending in an X-direction. The lightweight buoyant apparatus also includes a rail for slidingly supporting a load, the rail extending in a Y-direction, perpendicular to said X-direction, the rail supported at a midpoint of each of the plurality of horizontal rail support sections.

In another aspect, the invention is a water-based method of transferring heavy load items between a first watercraft and one of, a second watercraft, a pier, or a lightweight buoyant apparatus. In this aspect, the method includes, providing in a shallow water or low sea state environment, a first watercraft for loading and/or offloading one or more heavy load items. The method also includes, providing in the shallow or low sea state environment, a lightweight buoyant apparatus for transferring one or more heavy load items to and/or from said first watercraft, wherein the lightweight buoyant apparatus includes a reconfigurable floating platform arrangement. The reconfigurable floating platform has a first end portion having an outer edge and an inner edge, and a second end portion having an outer edge and an inner edge. The reconfigurable floating platform also has a third portion reconfigurable into several different arrangements including: a first arrangement in which the third portion is positioned between inner edges of the first end portion and the second end portion; a second arrangement in which the third portion is divided into two separate equal raft sections, wherein one of the two raft sections is attached to an outer edge of the first end portion and the other of the two raft sections is attached to an outer edge of the second end portion leaving a wholly open section between the first end portion and the second end portion; or a third arrangement in which the third portion is divided into two separate equal raft sections, wherein one of the two raft sections is attached to an outer edge of one of the first end portion and the second end portion, and the other of the two raft sections is positioned between the first end portion and the second end portion leaving a half-cut-out section between the first end portion and the second end portion. In this aspect, the lightweight buoyant apparatus also includes a plurality of substantially U-shaped load transferring frames, each of the substantially U-shaped load transferring frames having a first vertical section supported on the first end portion, a second vertical section supported on the second end portion, and a substantially U-shaped crossbeam extending from the first vertical section to the second vertical section. The substantially U-shaped crossbeam having a horizontal rail section extending in an X-direction. The lightweight buoyant apparatus also includes a rail for slidingly supporting a load, the rail extending in a Y-direction, perpendicular to the X-direction, the rail supported at a midpoint of each of the plurality of horizontal rail sections. The lightweight buoyant apparatus includes a bracket slidingly attached to the rail, the bracket having a holding device for holding the load. In this aspect, the method further includes, using the lightweight buoyant apparatus to transfer one or more heavy load items to and/or from the first watercraft.

In another aspect, the invention is a lightweight apparatus for transferring heavy loads. The lightweight apparatus includes a first base beam, a second base beam, and a plurality of beam supports for supporting the first and second base beams on a surface. The lightweight apparatus also includes a gantry mounted on the first and second base beams, the gantry having a plurality of substantially U-shaped load transferring frames. Each of the substantially U-shaped load transferring frames has a first vertical strut on the first end portion, a second vertical strut supported on the second end portion, and a substantially U-shaped crossbeam extending from the first vertical strut to the second vertical strut, the substantially U-shaped crossbeam having a horizontal support rail section. The lightweight apparatus further includes a rail for slidingly supporting the heavy load, the rail extending in a direction perpendicular horizontal rail supports of the substantially U-shaped load transferring frames, the rail supported at a midpoint of each of the plurality of horizontal rail support sections.

BRIEF DESCRIPTION OF THE DRAWINGS

Other features will be apparent from the description, the drawings, and the claims.

FIG. 2D is an exemplary illustration of the floating platform arrangement, showing a possible arrangement of the tube sections, according to an embodiment of the invention.

FIG. 2E is an exemplary illustration of the floating platform arrangement, showing a possible arrangement of the tube sections, according to an embodiment of the invention.

DETAILED DESCRIPTION

Figure 1:
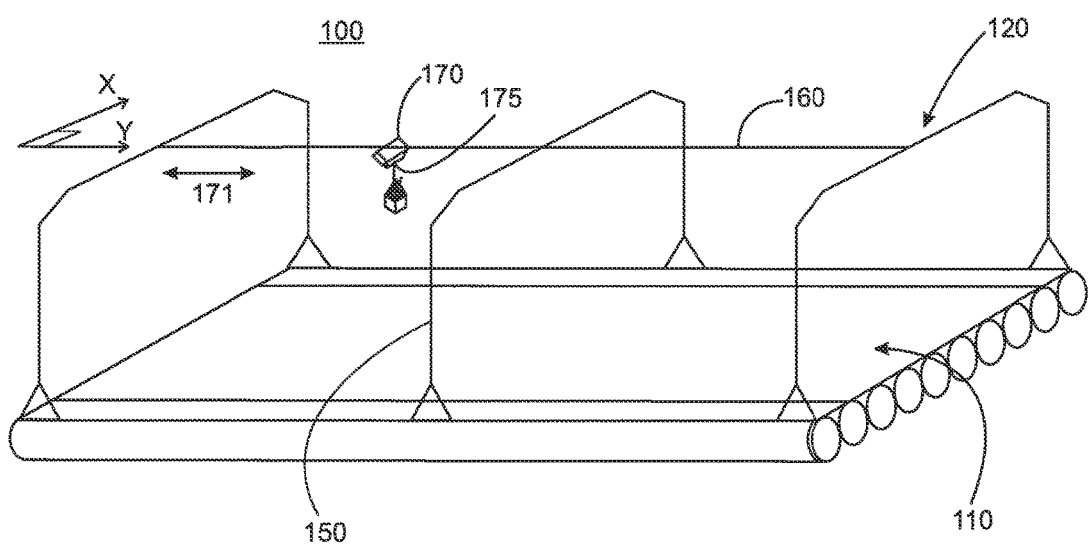
FIG. 1 is an exemplary illustration of a lightweight buoyant apparatus for transferring heavy loads, according to an embodiment of the invention.

FIG. 1 is an exemplary illustration of a lightweight buoyant apparatus 100 for transferring heavy loads, according to an embodiment of the invention. As outlined below, the lightweight buoyant apparatus 100 is designed to be readily transportable, before being assembled, by means of a van, or the like. The lightweight buoyant apparatus 100 may weigh about 5,000 to about 10,000 lbs., and is designed to be easily assembled in the field. The lightweight buoyant apparatus 100 may be employed in generally shallow waters for providing maintenance and loading services including the transferring of heavy weight items on or off watercrafts. The heavy weight units may be cargo or ship parts such as engines, transmissions, and unmanned marine vehicles. Because of its size and weight, the apparatus 100 may be employed in water as shallow as 2 ft. deep, but may also be used in riverine environments, sheltered harbors, and calm open water conditions. As outlined below, the lightweight buoyant apparatus 100 is a flexible reconfigurable apparatus that facilitates use in a broad spectrum of loading and maintenance situations. Additionally, as outlined below, the elements of the apparatus 100 are modular and lightweight, facilitating easy assembly and disassembly, with the parts small enough to fit inside a 20 ft. van or small enough to be flown by helicopter, thus providing users in remote locations with a maintenance platform, where the parts could be assembled or disassembled. Assembly may be accomplished by two or three users, with basic hand tools, and the air compressor.

As shown in FIG. 1, the lightweight buoyant apparatus 100 includes a floating platform arrangement 110. The floating platform arrangement 110 may be a pontoon made from a plurality of elongated inflated tubes (211, 231, 251), which are elongated in a Y-direction, as shown. As outlined below and illustrated in FIG. 2A, the tubes (211, 231, 251) may be cylindrical, and may be made from any suitable air-impervious material, which may typically be a rubber material similar to that used in rigid hull inflatable boats. The tubes have air chambers which when fully inflated provide relatively rigid walls. As outlined below, the elongated inflated tubes (211, 231, 251) may be attached to each other using connectors such as straps, D-rings, or the like. FIG. 1 also shows the buoyant apparatus 100 having a gantry arrangement 120. The gantry includes a plurality of substantially U-shaped load transferring frames 150, supported on the platform arrangement 110. FIG. 1 shows the gantry 120 having three substantially U-shaped load transferring frames 150, but depending on the application the gantry 120 may have more or less frames 150.

FIG. 1 also shows a rail 160 extending in the Y-direction, perpendicular to an X-direction, attached to the load transferring frames 150. Attached to the rail 160 is a bracket 170 with a holding mechanism 175 for holding heavy load items, the bracket 170 is in a sliding arrangement with respect to the rail 160. The holding mechanism 175 may be a hook or the like. As shown by arrow 171, the bracket 170 may slide back and forth in the Y-direction.

Figure 2A:
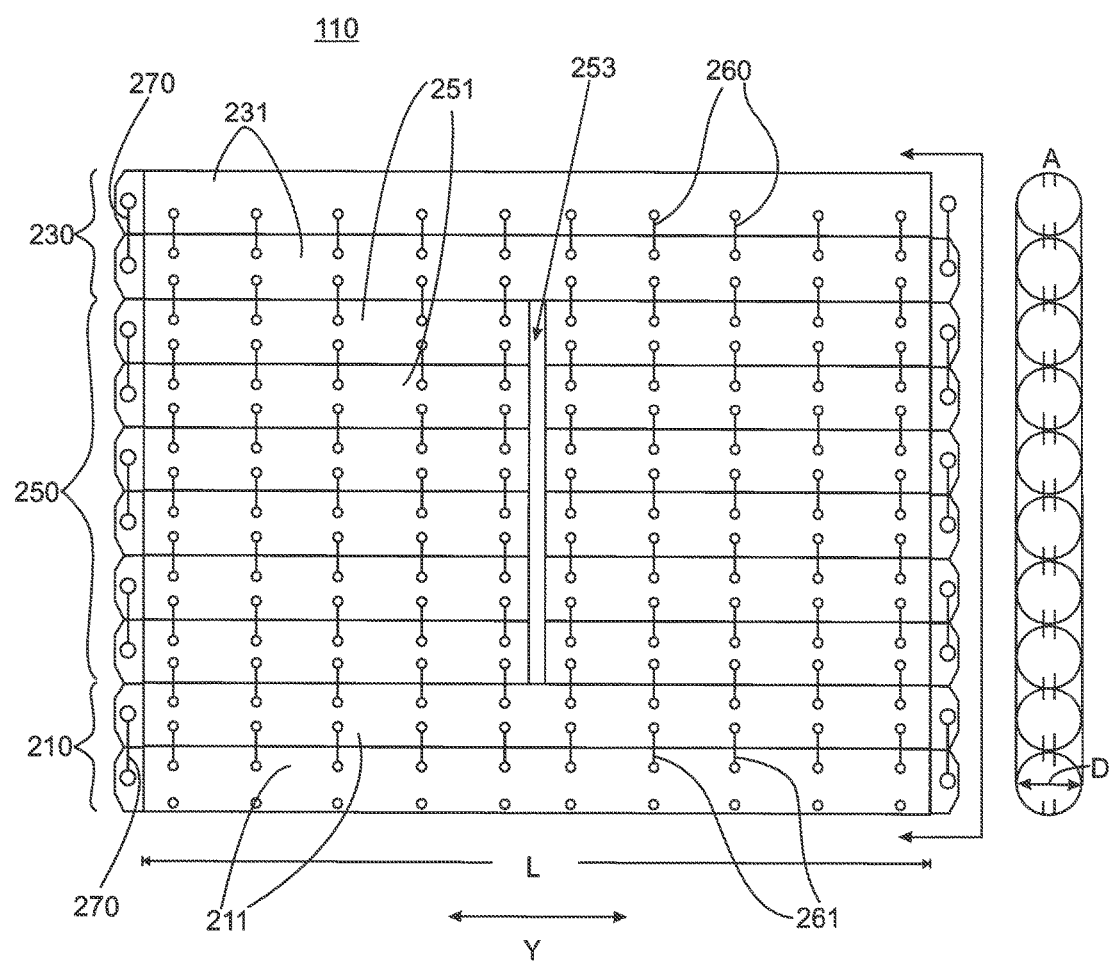
FIG. 2A is an exemplary illustration of a floating platform arrangement of the lightweight buoyant apparatus, according to an embodiment of the invention.

FIG. 2A is an exemplary illustration of the floating platform arrangement 110 of the lightweight buoyant apparatus 100, according to an embodiment of the invention. FIG. 2A shows the floating platform 110 having a first end portion 210, a second end portion 230, and a removable middle portion 250. Each of the first end portion 210, the second end portion 230, and the removable middle portion 250 comprises elongated inflated tubes, which extend in the Y-direction. As shown in the sectional at the right through line A-A of FIG. 2A, the tubes may be cylindrical. Additionally, the tubes may be made from any suitable air-impervious material, such as rubber, similar to that used in rigid hull inflatable boats. The tubes have air chambers which when fully inflated provide relatively rigid walls. An advantage of the floating platform arrangement 110, is that the tubes may be remotely inflated with the assistance of a small engine powered diesel compressor, which may be included in an assembly kit.

According to this embodiment, the first end portion 210 includes two elongated inflated tubes 211. As shown, the tubes have a length L and a diameter D. Similarly, according to this embodiment, the second end portion 230 also includes two elongated inflated tubes 231, extending in the Y-direction, having a length L. As outlined below, the tubes within each of the sets 211 and 231 are connected using the plurality of connectors 260, positioned along the length of the tubes (211, 231) and connectors 270, positioned at the outer face of the tubes (211, 231). The connectors 260 and 270 may be D-rings and straps, thereby making the first and second end portions (210, 230) easy to assemble.

The removable middle portion 250 may also comprise a plurality of elongated inflated tubes 251 extending in said Y-direction substantially perpendicular to said X-direction. According to this embodiment, the removable middle portion 250 is divided into two separate tube/raft sections 250a and 250b, in a side-by-side symmetrical arrangement. As outlined below, the sections 250a and 250b are designed to be separated from the remainder of the floating platform arrangement 110. Both sections (250a, 250b), or one of the sections (250a, 250b) may be separated, thereby leaving the floating platform arrangement 110 with a wholly open middle section or a partial cutout section. As outlined below, the two separate tube/raft sections 250a and 250b are not reinforced in the same manner as first and second end portions 210 and 230, and may be used as rafts or docks, or the like to facilitate maintenance on watercrafts.

The tube/raft sections 250a and 250b face may contact each other at a central zone 253 between the two tube sections. Each of the tube/raft sections 250a and 250b comprises six elongated inflated tubes 251. The tubes 251 in each section (250a, 250b) are connected to each other by connectors such as D-rings and straps. As shown, the tubes 251 may have a diameter D, and a length of l. The length l is about L/2, so that when the sections 250a and 230b are in the side-by-side symmetrical arrangement, the total length combined is about L. As with the first and second end portions 210 and 230, the tubes 511 are connected using the plurality of connectors 260, positioned along the length of the tubes and connectors 270, positioned at the outer face of the tubes. The connectors 260 and 270 may optionally be used to connect the first end portion 210 to the removable middle portion 250, and the second end portion 230 to the removable middle portion 250. The connectors 260 and 270 may be D-rings and straps. The arrangement of connectors 260 and 270 facilitates the easy assembly of the platform 110.

According to an embodiment of the invention, the diameter of D of the cylindrical tubes 211, 231, and 251 is about 2 ft. According to this embodiment, the length L is about 30 ft. According to this embodiment, the length l is about 15 ft. According to this embodiment the floating platform arrangement 110 has an overall length of about 30 ft., and an overall width of about 20 ft. It should be noted that this is only one embodiment, and other dimensions and arrangements for the floating platform arrangement are possible, depending on the application. The length L may be 20 ft. or 40 ft. if desired, and the overall width W may be 10 ft. or 30 ft. if desired. The diameter D of the tubes may also be varied if desired. Additionally, regarding the structure, the first and second end portions 210 and 230 may have three or four cylindrical tubes each, as opposed to the two shown in FIG. 2A. Similarly, the removable middle portions 250a and 250b may each have eight or ten tubes 251, as opposed to the six shown in FIG. 2A.

As stated above, the removable middle portion 250 is divided into two separate tube/raft sections 250a and 250b. The tube/raft sections 250a and 250b may operate individually as rafts, and are designed to be separated from the remainder of the floating platform arrangement 110. The tube/raft sections 250a and 250b may also be re-attached or tethered to other parts of the floating platform arrangement. FIGS. 2D, 2E, and 2F are exemplary illustrations the floating platform arrangement 110, showing possible arrangements of the tube/raft sections 250a and 250b. As shown, FIG. 2D shows the tube/raft sections 250a and 250b positioned between the first and the second end portions 210 and 230, at inner edge portions of the respective end portions 210 and 230. As outlined below, operators of the lightweight buoyant apparatus 100 may perform loading/maintenance services from the tube/raft sections 250a and 250b when the tube/raft sections 250a and 250b are in the positions illustrated in FIG. 2D.

FIG. 2E shows the tube sections removed from between the first and second end portions 210 and 230, leaving a wholly open section between the first and second end portions 210 and 230. As outlined below, watercrafts may enter into this open section to perform loading and/or maintenance services. FIG. 2E, also shows the tube/raft sections 250a and 250b attached to outer edges of the first and second end portions 210 and 230. When in the positions shown in FIG. 2E, the tube/raft sections 250a and 250b may be used as makeshift docks. Thus, operators may stand on these makeshift docks 250a and 250b while performing loading/maintenance functions. Alternatively, the tube/raft sections 250a and 250b may be merely tethered in the FIG. 2E position to show that they do not float away. By removing the tube sections 250a and 250b, a working gap G is left in the floating platform 110. According to an embodiment of the invention, the gap G is about 11 ft. to about 12 ft., which is sized to accept therewithin the watercrafts of corresponding beams. FIG. 2F shows one of the tube sections 250a removed, leaving tube section 250b and a half cutout section with a gap g. The removed tube/raft section 250a may optionally be attached to the outside edge of the first end portion 210. This may be done merely to tether the raft section 250a so that it does not drift away, or it may be done for functional purposes in which the tube/raft section 250a is used as a makeshift dock.

Figure 2B:
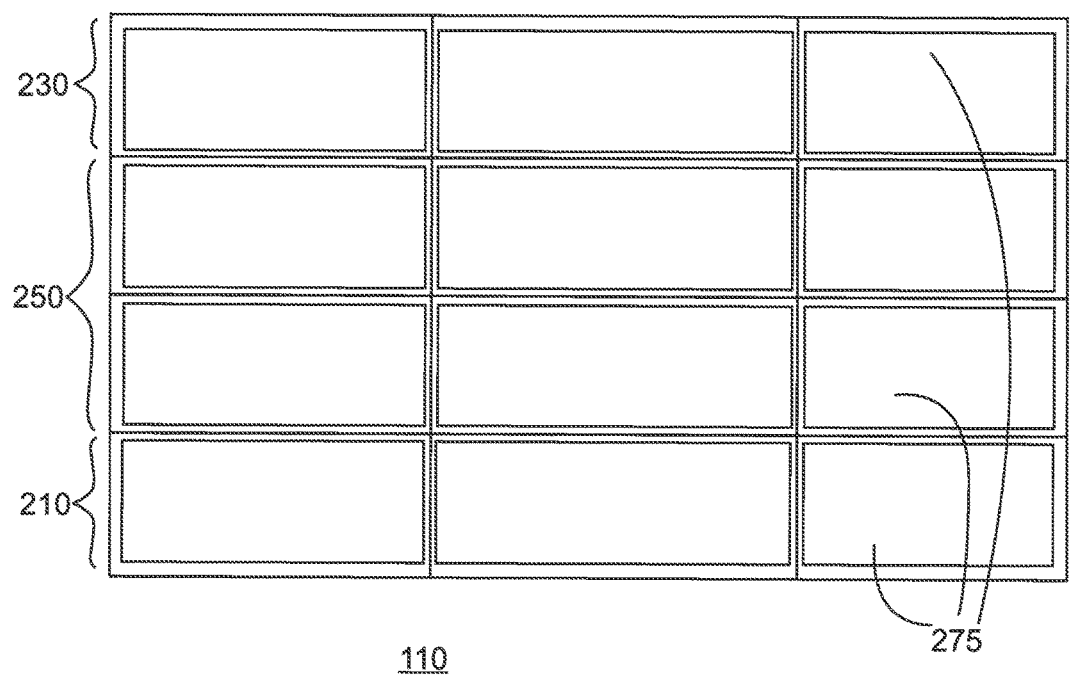
FIG. 2B is an exemplary illustration of a floating platform arrangement of the lightweight buoyant apparatus, according to an embodiment of the invention.

FIG. 2B is an exemplary illustration of a floating platform arrangement 110 of the lightweight buoyant apparatus, according to an embodiment of the invention. FIG. 2B shows modular grating sections 275, which are positioned above the inflated tubes (211, 231, 251) of the floating platform 110. The modular grating sections are sized to allow for the separation of the middle portion 250 from the first and second end portions 210 and 230. Consequently, each of the first end portion 210, the second end portion 230, include modular grating sections 275 that fit the respective portion. The middle portion 250 may also include modular grating sections 275. Thus, because the first end portion 210 has a surface area of approximately W×2D, the front end portion includes one or more modular grating sections that cover the W×2D surface area. According to an embodiment of the invention, W is about 30 ft. and D is about 2 ft., thus the relevant surface area for the first end portion 201 is about 120 ft². As shown in FIG. 2B, the first end portion 210 is covered by three modular grating sections 275 that cover that area, with the modular grating sections being substantially the same size. Alternatively, the first end portion 210 may be covered by two or one modular grating sections.

The second end portion 230 is also covered with modular grating sections 275. As shown, there are also three modular grating sections 275, but as stated above, the second end portion 230 may be covered by two or one modular grating sections. As stated above, the removable middle portion 250 may optionally be covered with six modular grating sections. Alternatively, a different number of gratings, such as four or eight gratings may be used in the middle portion 250. The modular grating sections 275 may be also be attached to the tubes with D-rings and straps, or any other desired connector. Again, this facilitates easy assembly.

Figure 2C:
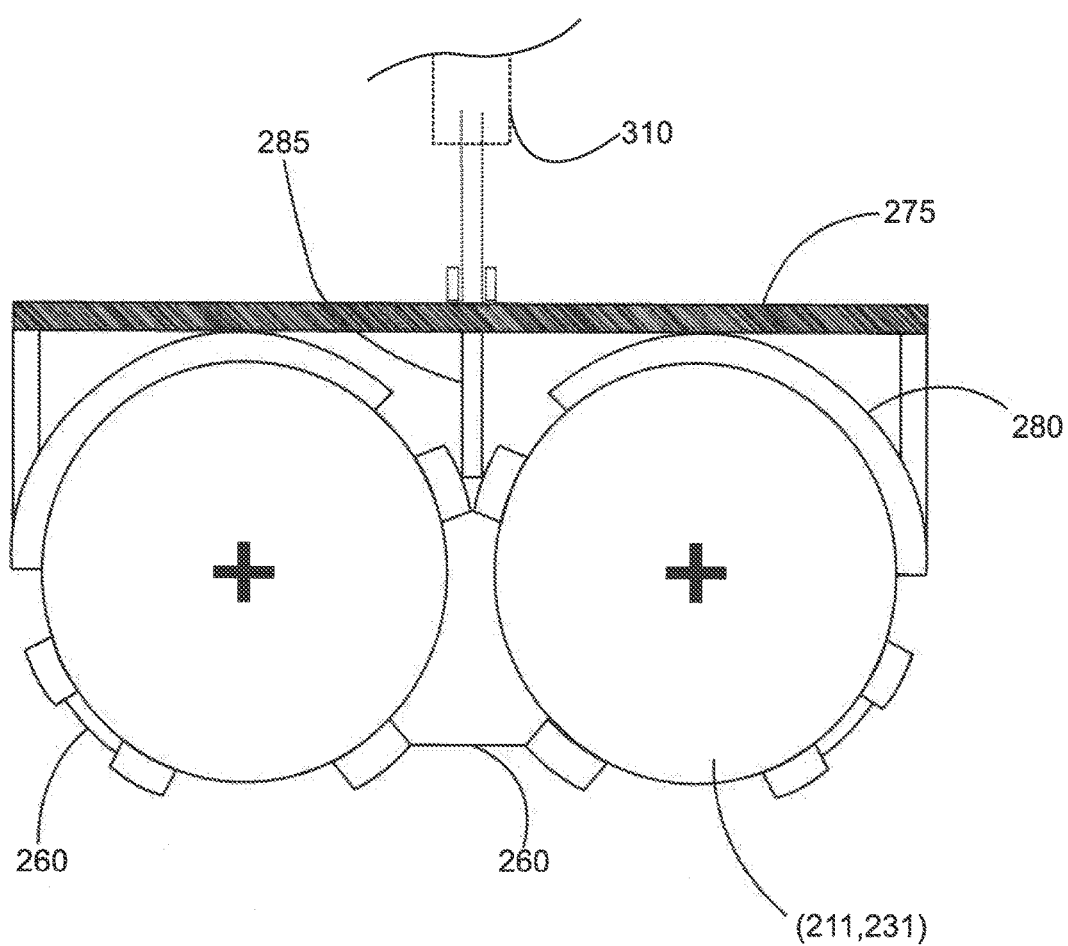
FIG. 2C is an exemplary illustration of a floating platform arrangement of the lightweight buoyant apparatus, according to an embodiment of the invention.
Figure 2F:
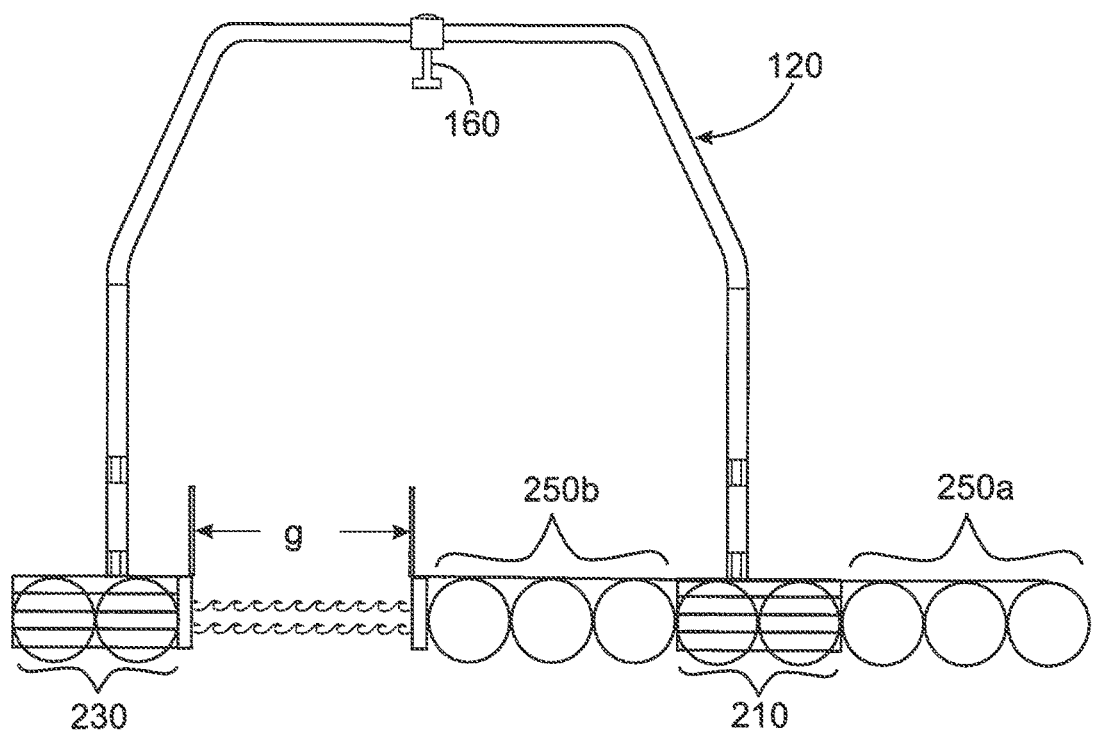
FIG. 2F is an exemplary illustration of the floating platform arrangement, showing a possible arrangement of the tube sections, according to an embodiment of the invention.

FIG. 2C is an exemplary sectional illustration of the first and second end portions (210, 230) of the floating platform arrangement 110 of the lightweight buoyant apparatus 100, according to an embodiment of the invention. The inflated tubes shown in FIG. 2C are representative of the tubes 211 and 231, of first and second end portions 210 and 230, respectively. As outlined below, the first and second end portions 210 and 230 are reinforced because these portions support the bulk of the weight carried by the lightweight buoyant apparatus 100. FIG. 2C shows outer reinforcement plates 280 extending circumferentially around the tubes (211, 231) providing additional stability to the tubes in the first and second end portions 210 and 230. As shown, the outer reinforcement plates 280 may extend up to about 50%, of the cylindrical outer surface of the tubes (211, 231). FIG. 2C also shows a transition support plate 285 extending vertically upwards between adjacent inflated tubes towards the grating 275, thereby providing additional reinforcement and weight-bearing support. In dotted lines, FIG. 2C shows vertical strut 310 of a gantry (outlined below), the vertical strut aligned with the transition support plate 285.

Regarding the various embodiments of the floating platform 110, as outlined with respect to the illustration of FIGS. 2A-2F, it should be noted that the floating platform 110 is essentially modular. The various elements such as the tubes and the modular grating sections, e.g., may be assembled in the field by a user. The use of connecting devices such as straps and D-rings as outlined above, facilitate the easy assembly of the interconnected elements.

Figure 3A:
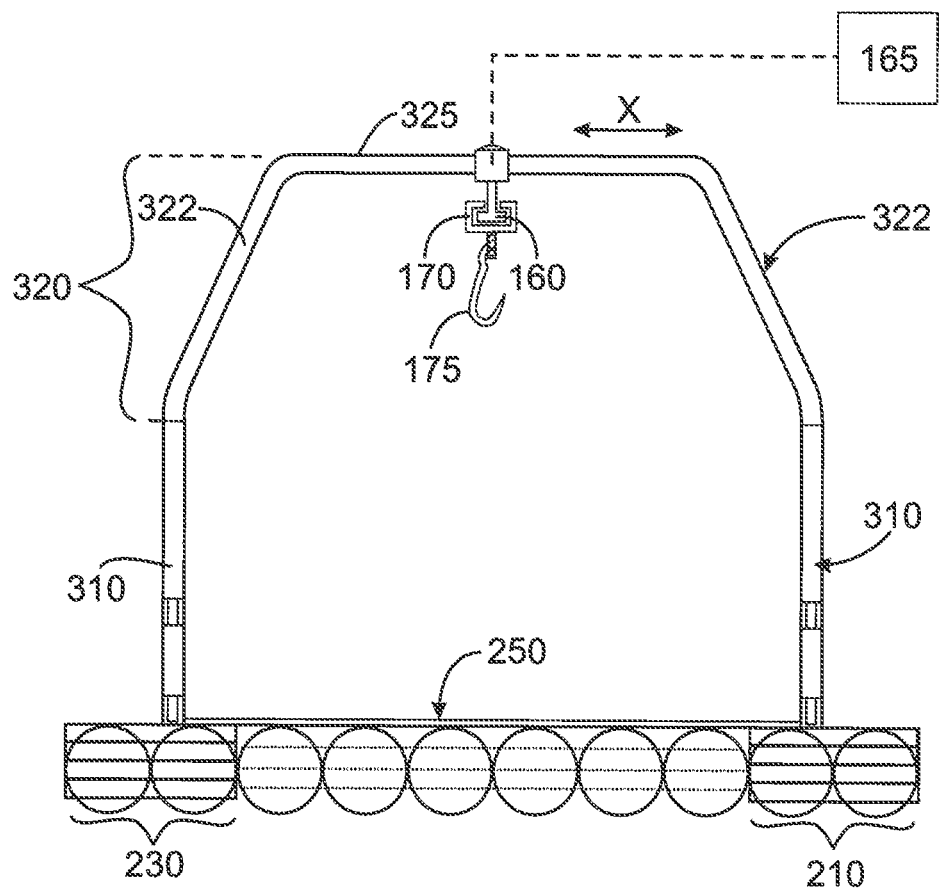
FIG. 3A is an exemplary perspective illustration of a gantry arrangement on the floating platform arrangement, according to an embodiment of the invention.

FIG. 3A is an exemplary perspective illustration of a gantry 120 on the floating platform arrangement 110, according to an embodiment of the invention. FIG. 3A shows one of a plurality of substantially U-shaped load transferring frames 150 of the gantry 120. As shown the substantially U-shaped load transferring frames 150 include vertical strut portions 310, which as outlined above, are aligned with transition support plates 285. FIG. 3A also shows a substantially U-shaped crossbeam 320 connected at the ends to the vertical struts 310. The substantially U-shaped crossbeam 320 may be joined by a tube and socket sleeve joint to the vertical struts 310 with a pin joint or the like, facilitating easy assembly. FIG. 3A shows the substantially U-shaped crossbeam 320 having oblique sections 322 connected to a horizontal rail support sections 325 extending in an X-direction over the removable middle portion 250 of the floating platform arrangement 110.

Figure 3B:
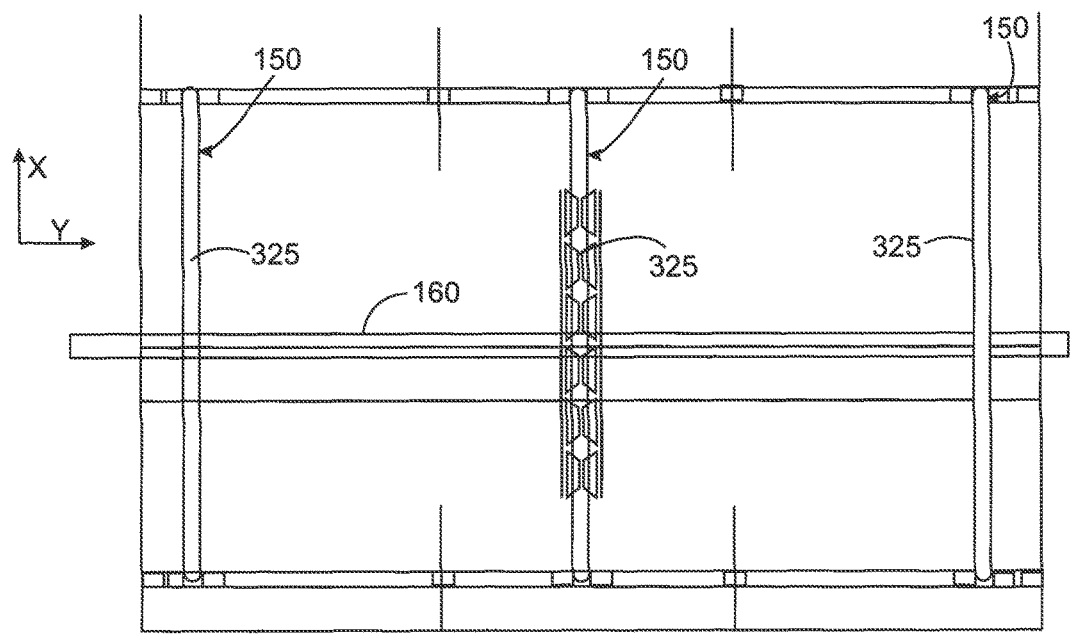
FIG. 3B is an exemplary top view of the gantry on the floating platform arrangement, according to an embodiment of the invention.

FIG. 3A also shows a rail 160 for slidingly supporting a load. According to the view in FIG. 3A, the rail 160 extends into the page. FIG. 3B is an exemplary top view of the gantry 120 on the floating platform arrangement 110, according to an embodiment of the invention. FIG. 3B shows the lightweight buoyant apparatus 100 having three load transferring frames 150. The rail 160 is connected to the supports 325 at substantially at midpoints of the supports 325. As shown in FIG. 3B and FIG. 1, the horizontal rail supports 325 extend in the X-direction, and the attached rail 160 extends above the floating platform arrangement 110 in the Y-direction, perpendicular to the X-direction.

FIG. 3A also shows the bracket 170 with the holding mechanism 175 for holding heavy load items. As outlined below, heavy loads are transported by the bracket 170 when the bracket 170 slides along the rail 160. As shown, the rail 160 may be a monorail, or other known rail system. The back and forth motion of the bracket 170 along the rail 160 may be controlled by an actuator 165 (shown schematically) or an equivalent device, connected to the rail 160 and/or bracket 170. The actuator 165 may be a manual, a pneumatic, or an electrical actuator. FIG. 3A also shows the holding mechanism 175, which may be a hook.

Figure 3C:
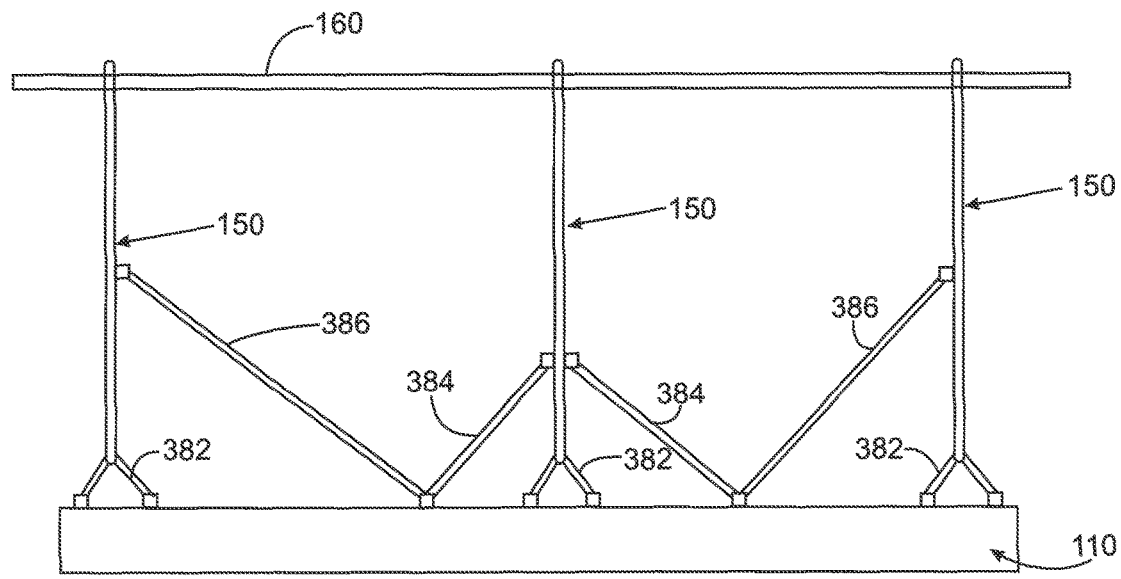
FIG. 3C is an exemplary side view of the gantry on the floating platform arrangement, according to an embodiment of the invention.

FIG. 3C is an exemplary side view of the gantry 120 on the floating platform arrangement 110, according to an embodiment of the invention. FIG. 3C shows three load transferring frames 150. FIG. 3C also shows a network of auxiliary support struts 382, 384, and 386 that may be used to provide additional support to the gantry 120 and load transition to platform arrangement 110. The illustration of FIG. 3C also includes a tarpaulin 390 (show as dotted line), positioned over the horizontal rail supports 325, thereby concealing operations inside the lightweight buoyant apparatus 100 when privacy is a concern.

Figure 4A:
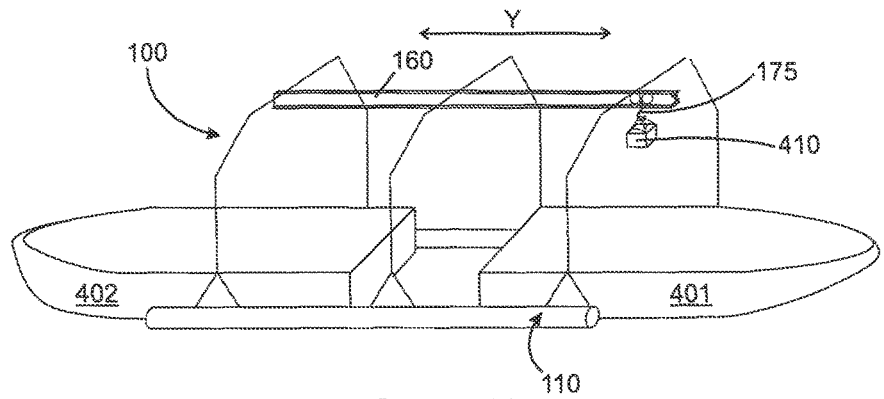
FIG. 4A is an exemplary schematic illustration of an arrangement for transferring heavy load units from one water craft to another, utilizing a lightweight buoyant apparatus, according to an embodiment of the invention.
Figure 4B:
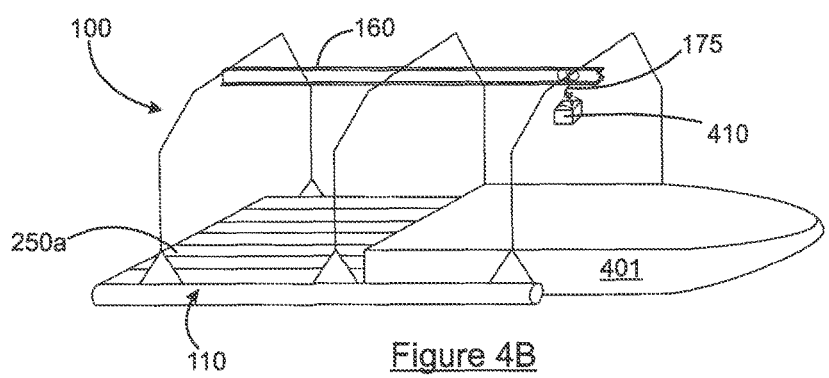
FIG. 4B is an exemplary schematic illustration of an arrangement for transferring heavy load units from one water craft to another, utilizing a floating platform arrangement, according to an embodiment of the invention.
Figure 4C:
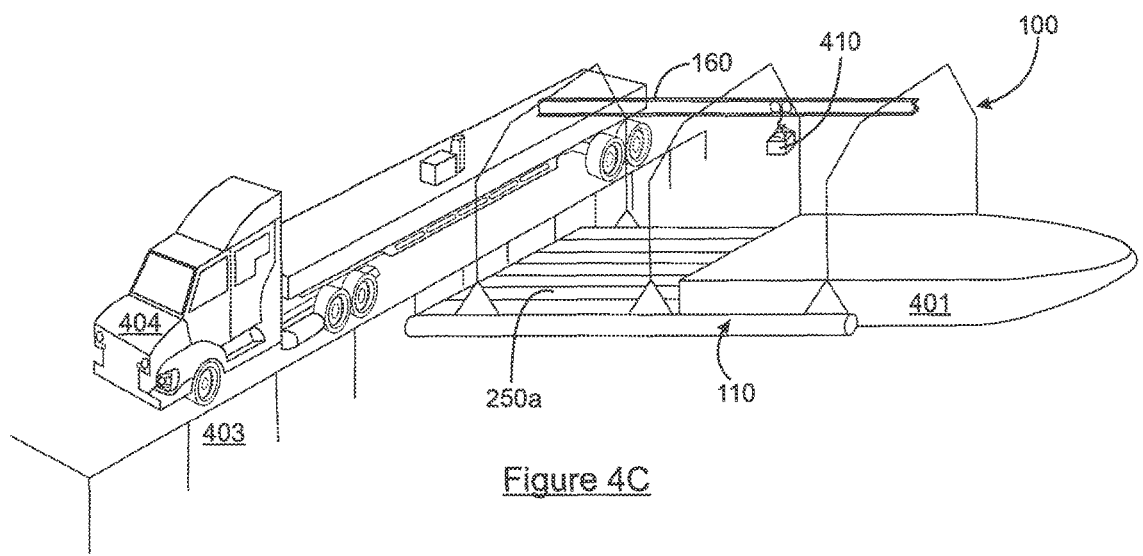
FIG. 4C is an exemplary schematic illustration of an arrangement for transferring heavy load units from one water craft to a pier, according to an embodiment of the invention.

As outlined above, lightweight buoyant apparatus 100 is reconfigurable, and may be used to transfer heavy load items in a wide variety of situations, such as cargo loading or unloading, moving unmanned marine vehicles, or in maintenance or repair situations. The lightweight buoyant apparatus 100 may be employed in water as shallow as 2 ft. deep, but may also be used in riverine environments, sheltered harbors, and open water conditions with low sea states. The apparatus 100 may be used in ship-to-ship or ship-to-dock situations. The lightweight buoyant apparatus 100 may weigh about 5,000-10,000 lbs. Additionally, as outlined above, the apparatus is modular, and this feature in combination with its light weight, makes it easy to transport and assemble in the field. FIGS. 4A-4C are exemplary schematic illustrations of arrangements involving one or more watercrafts for transferring heavy load units 410, utilizing a lightweight buoyant apparatus 100, according to embodiments of the invention.

FIG. 4A is an exemplary schematic illustration of an arrangement for transferring one or more heavy load units 410 from one watercraft 401 to another watercraft 402, utilizing the lightweight buoyant apparatus 100, according to an embodiment of the invention. The one or more heavy load units 410 may be any type of cargo, watercraft part, or the like, and according to the embodiment of FIG. 4A, the transfer occurs in the water. Heavy load units 410 may weigh up to 2,000 lbs. and as shown, is transferred in the Y-direction from watercraft 401 to watercraft 402 via the gantry 120. It should be noted that the design could be scaled so that it can transfer loads that are greater than 2000 lbs. As outlined above, heavy load units are held by the bracket 170 via the holding mechanism 175, and are transferred by sliding the bracket 170 along the rail 160. Depending on the type of heavy load units 410 and operation goals, an appropriate action will be taken by an operator. For example, if the one or more heavy load units 410 are merely cargo to be transported, then the cargo is appropriately stored and transported to the desired destination by the watercraft 402. If the one or more heavy load unit is a ship part in need of immediate repair or service, then the part may be serviced on the watercraft 402, then returned to the watercraft 401 when servicing is complete.

In the embodiment of FIG. 4A the middle portion 250 of the floating platform 110 is removed, i.e., both portions 250a and 250b. The removal of the middle portion 250 leaves a wholly open section between the first end portion 210 and the second end portion 230. This wholly open section is occupied by the watercrafts 401 and 402, which allows the watercrafts to be close together in a back-to-back arrangement, as shown. This back-to-back arrangement of the first and second watercrafts 401 and 402 facilitates an efficient transfer of the heavy load units 410. When removed from between the first and second end portions 210 and 230, the removed middle portions 250a and 250b (not shows in FIG. 4A) may be attached to outer edges of the first and second portions 210 and 230, as shown in FIG. 2E. The portions 250a and 250b may be attached as shown in FIG. 2E for mere tethering purposes. However, the portions 250a and 250b may also be used as makeshift docks during the performance of loading and/or maintenance services.

FIG. 4B is an exemplary schematic illustration of an arrangement for transferring one or more heavy load units 410 from one watercraft 401 to the lightweight buoyant apparatus 100, according to an embodiment of the invention. The environmental conditions regarding the water depth etc. are similar to those outlined above with respect to the description of FIG. 4A. Similarly, the one or more heavy load units 410 outlined with respect to FIG. 4A are also applicable to the embodiment of FIG. 4B. The embodiment of FIG. 4B is most applicable to situations where there is maintenance or repair of watercraft parts being performed on the lightweight buoyant apparatus.

As shown, the watercraft 401 is backed into the half cut-out section of the floating platform 110, the cut-out section made possible by removal of one of the one of the two substantially identical tube/raft sections 250a and 250a. FIG. 4B shows tube section 250b removed and the watercraft 401 is backed into the vacant space left by the removal of tube/raft section 250b. According to this embodiment one or more heavy load units 410 is transferred from the watercraft 401 to the tube/raft section 250a via the gantry. As outlined above, the one or more heavy load units 410 are mounted onto the holding mechanism 175 on the bracket 170, which slides along the rail 160 to transfer the load. According to this embodiment, the one or more heavy load units 410 may be a part of the watercraft, such as an engine, transmission, propeller, or the like, which is serviced and/or repaired on the makeshift deck 250a. After servicing is completed, the one or more heavy load units 410 may be transferred back to the watercraft 401, again using the gantry 120.

FIG. 4C is an exemplary schematic illustration of an arrangement for transferring one or more heavy load items 410 between a watercraft 401 and a pier 403, according to an embodiment of the invention. The environmental conditions regarding the water depth etc. are similar to those outlined above with respect to the description of FIGS. 4A and 4B. Similarly, the one or more heavy load items 410 outlined with respect to FIGS. 4A and 4B are also applicable to the embodiment of FIG. 4C. According to this embodiment, heavy load items 410 may be transferred via the gantry 120 between the pier 403 and the watercraft 401. Similar to the embodiment of FIG. 4B, the tube section 250b is removed and the watercraft 401 is backed into the vacant space. In this embodiment, the remaining middle portion tube/raft section 450a may be used as a staging member on which an operator may stand to ensure the proper transfer of heavy load units 410 to the pier 403 or to the watercraft 401. FIG. 4C also shows a truck 404 on the pier 403, which may also be used in the transferring of heavy load items 410.

It should be noted that FIGS. 4A-4C show only three possible exemplary schematic illustrations of arrangements involving one or more watercrafts for transferring heavy load units 410, utilizing a lightweight buoyant apparatus 100. Because of the many features of the apparatus 100 including the size and the ability to be reconfigured, the apparatus 100 may be employed in many other loading and/or maintenance applications that are not illustrated in FIGS. 4A-4C. For example, the lightweight buoyant apparatus 100 may be used to load and offload cargo from larger ships, with the apparatus 100 configured as shown in FIG. 2D with the middle portion 250 located between the first and second end portions 210 and 230.

Figure 5:
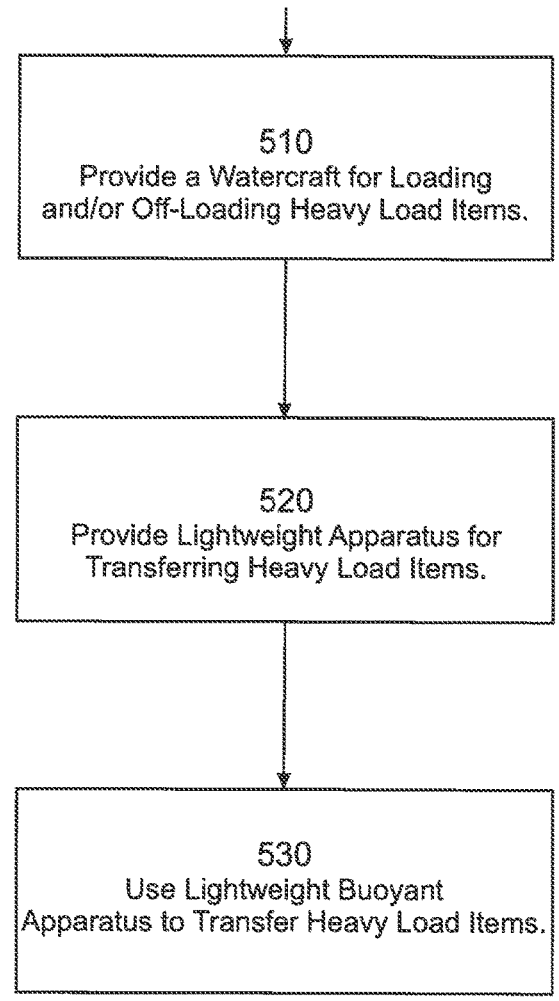
FIG. 5 is an exemplary flow diagram outlining steps involved in a method of transferring heavy load items from a first water craft to a second water craft, according to an embodiment of the invention.

FIG. 5 is a flowchart illustrating a water-based method 500 of transferring heavy load items 410 between a first watercraft and one of, a second watercraft 402, a pier 403, or a lightweight buoyant apparatus 100. The steps involved in the water-based method 500 of transferring heavy load items have been outlined above in detail in the description with respect to FIGS. 1-4C. The flowchart of FIG. 5 merely provides a broad overview of some steps involved. Step 510 is the providing, in a shallow water or low sea state environment, a first watercraft for loading and/or offloading one or more heavy load items. As outlined above, the heavy load items 410 may be cargo, or a ship part such as an engine, transmission, or rotor.

Step 520 is the providing, in said shallow water or low sea state environment, a lightweight buoyant apparatus for transferring one or more heavy load items 410 to and/or from said first watercraft. FIGS. 1-3C illustrate many of the features of the lightweight buoyant apparatus 100, including a floating platform arrangement 110 having, a first end portion 210, a second end portion 230, and a removable middle portion 250. FIGS. 1-3C also illustrate the gantry 120 for lifting and transferring heavy load items.

Step 530 is using the lightweight buoyant apparatus 100 to transfer one or more heavy load items to and/or from the first watercraft 401. As outlined above, the lightweight buoyant apparatus 100 is positioned in close proximity to the first watercraft 401 allowing heavy load items 410 to be positioned on the gantry for transfer between the apparatus 100 and the first watercraft 401. FIGS. 4A-4C are exemplary schematic illustrations of arrangements involving the first watercraft 401, the lightweight buoyant apparatus 100, and optionally, a second watercraft 402, or a pier 403, in which heavy load items 410 may be transferred. For example, FIG. 4A illustrates an arrangement for transferring one or more heavy load units 410 from the first watercraft 401 to the second watercraft 402, utilizing the lightweight buoyant apparatus 100. FIG. 4C illustrates an arrangement for transferring one or more heavy load units 410 between the first watercraft 401 and a pier 403.

Figure 6C:
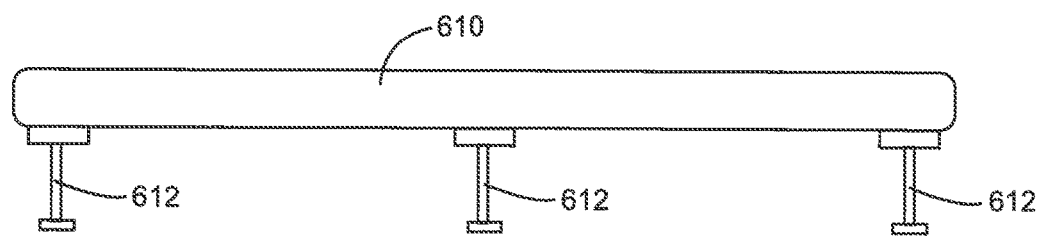
FIG. 6C is an exemplary illustration of an alternative base arrangement for a lightweight apparatus for transferring heavy loads, according to an embodiment of the invention.
Figure 6A:
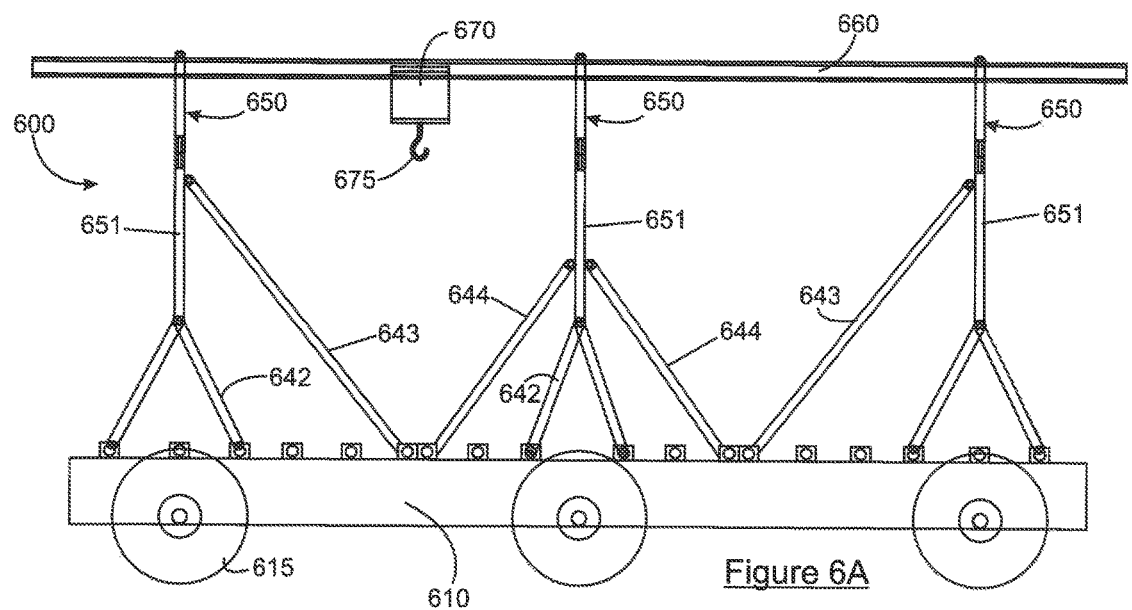
FIG. 6A is an exemplary illustration of a lightweight apparatus for transferring heavy loads, according to an embodiment of the invention.
Figure 6B:
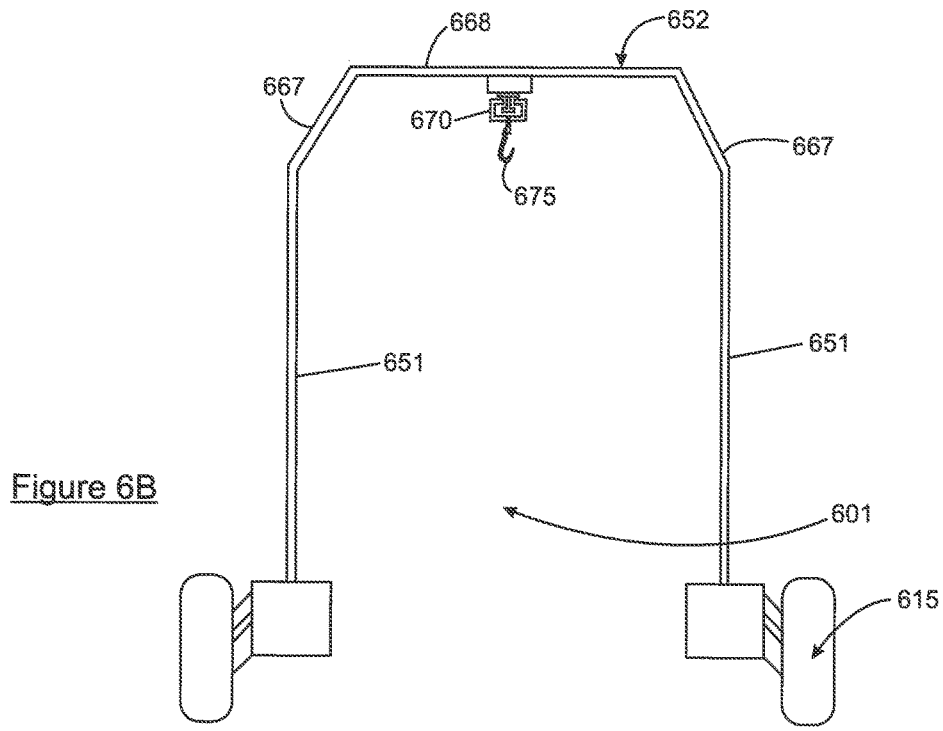
FIG. 6B is an exemplary illustration of a lightweight apparatus for transferring heavy loads, according to an embodiment of the invention.

FIGS. 6A and 6B are exemplary illustrations of a lightweight apparatus 600 for transferring heavy loads, according to an embodiment of the invention. As opposed to the lightweight buoyant apparatus 100, as shown in FIG. 1, the lightweight apparatus 600 is designed to operate on land, and thus does not include a floating platform arrangement. Apart from the floating platform, the lightweight apparatus 600 is similar to the lightweight buoyant apparatus 100.

As shown in FIGS. 6A and 6B, the lightweight apparatus 600 for transferring heavy loads 600 includes base beams 610. The apparatus 600 also includes a gantry 620 mounted to the base beams 610. As shown, the beams 610 are supported on wheels 615, which facilitate the transportation of the lightweight apparatus 600 on land surfaces such as asphalt, dirt, sand, mud, rock, and other terrains. The wheels 615 may be soft and wide to accommodate for the wide range surfaces. The wheels 615 and the base beams 610 are designed to be easily assembled and disassembled. The wheels may be removed to save weight for specific missions.

FIG. 6A shows three load transferring frames 650. FIG. 6A also shows a rail 660 mounted to the frames 650. The rail 660 is for slidingly supporting a load. FIG. 6B offers a side view via BB' of FIG. 6A. This, FIG. 6B shows one of the frames 650, in which the substantially U-shape of the load transferring frame 650 is visible. As shown the substantially U-shaped load transferring frame 650 includes vertical strut portions 651. FIG. 6A shows auxiliary support struts 642, 643, and 644 supporting the vertical strut portions 651. FIG. 6B shows a substantially U-shaped crossbeam 652 connected at the ends to the vertical struts 651. The substantially U-shaped crossbeam 652 may be snapped onto and connected to the vertical struts 651 with a pin joint or the like. FIG. 6B shows the substantially U-shaped crossbeam having oblique sections 667 connected to a horizontal rail support section 668. FIGS. 6A and 6B show the rail 660 connected to horizontal rail supports 668 of the load transferring frames 650. The rail 660 is connected to the supports 668 at substantially at midpoints of the supports 668. Attached to the rail 660 is a bracket 670 with a holding mechanism 675 for holding heavy load items, the bracket 670 in a sliding arrangement with respect to the rail 660.

As shown in FIG. 6B, the lightweight apparatus are oriented so that it has an open area 601 within. In operation, a truck or the like could back up into this open area 601 to facilitate the loading or offloading of cargo. When a truck or the like is in position, heavy load items may be transferred back and forth by the sliding action of the bracket 670 on the rail 660.

FIG. 6C is an exemplary illustration of an alternative base arrangement for a lightweight apparatus 600 for transferring heavy loads, according to an embodiment of the invention. FIG. 6C shows the base beams 610. As opposed to the embodiment of FIGS. 6A and 6B, the apparatus 600 is supported on vertical posts 612, as opposed to the wheels 615. The posts 612 may be adjustable in order to provide stable footing on different surfaces, such as pier, deck, or asphalt surfaces, which may not be level. It should be noted that in the embodiment of FIG. 6C, apart from the vertical posts 612, all the other elements of the invention are the same as illustrated in FIGS. 6A and 6B. The FIG. 6C embodiment may be used in land based operations on asphalt, or pavement, or the like.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A lightweight buoyant apparatus for transferring heavy loads, comprising:
   a floating platform arrangement comprising;
      a first end portion,
      a second end portion, and
   a removable middle portion between the first end portion and the second end portion, wherein each of the first end portion, the second end portion, and the middle portion comprise a plurality of inflated tubes,
   a gantry comprising:
      a plurality of substantially U-shaped load transferring frames, each of the substantially U-shaped load transferring frames comprising;
         a first vertical strut on the first end portion, a second vertical strut supported on the second end portion, and a substantially U-shaped crossbeam extending from the first vertical strut to the second vertical strut, the substantially U-shaped crossbeam having a horizontal rail support section extending in an X-direction over the removable middle portion of the floating platform arrangement, and a rail for slidingly supporting a load, the rail extending in a Y-direction, perpendicular to said X-direction, the rail supported at a midpoint of each of the plurality of horizontal rail support sections.

2. The lightweight buoyant apparatus of claim 1, wherein in the floating platform arrangement, the first end portion comprises at least two elongated inflated tubes attached to each other with connectors, each of the at least two elongated inflated tubes extending in said Y-direction substantially perpendicular to said X-direction, the second end portion comprises at least two elongated inflated tubes attached to each other with connectors, each of the at least two elongated inflated tubes extending in said Y-direction substantially perpendicular to said X-direction, and the removable middle portion comprises a plurality of elongated inflated tubes attached to each other with connectors, each of the plurality of elongated inflated tubes extending in said Y-direction substantially perpendicular to said X-direction.

3. The lightweight buoyant apparatus of claim 2, wherein in the floating platform arrangement, the at least two elongated inflated tubes of the first end portion have a length L in said Y-direction, the at least two elongated inflated tubes of the second end portion have a length L in said Y-direction, and the removable middle portion comprises first and second raft sections of substantially equal sizes, in a side-by-side symmetrical arrangement, wherein said plurality of elongated inflated tubes in each of the first and second raft sections have a length of about L/2 in said Y-direction, so that in said side-by-side symmetric arrangement, the first and second raft sections have a combined length of about L in said Y-direction.

4. The lightweight buoyant apparatus of claim 3, wherein the floating platform arrangement further comprises a plurality of modular grating sections positioned on the inflated tubes of each of the first end portion, the second end portion, and the middle portion of the floating platform arrangement.

5. The lightweight buoyant apparatus of claim 4, wherein the first end portion and the second end portion further include stiffened aluminum transition support extending vertically upwards between adjacent inflated tubes towards the grating sections.

6. The lightweight buoyant apparatus of claim 5, wherein the rail for slidingly supporting a load is a monorail, the lightweight buoyant apparatus further comprising a bracket with a hook for carrying the load, the bracket slidingly attached to the monorail, and an actuator for moving the bracket along the monorail back and forth in the Y-direction.

* * * * *